United States Patent [19]

Clevenger

[11] Patent Number: 4,528,228
[45] Date of Patent: Jul. 9, 1985

[54] ATMOSPHERE CONTROL CUSHIONING PAD

[75] Inventor: David M. Clevenger, Yakima, Wash.

[73] Assignee: Michelsen Packaging Company, Yakima, Wash.

[21] Appl. No.: 540,930

[22] Filed: Oct. 11, 1983

[51] Int. Cl.$^3$ .............................................. B32B 1/04
[52] U.S. Cl. ...................... 428/74; 428/76; 426/118; 426/124; 426/419
[58] Field of Search .................... 428/74, 76; 426/118, 426/124, 419

[56] References Cited

U.S. PATENT DOCUMENTS

| | | | |
|---|---|---|---|
| 216,535 | 6/1979 | Sigwald | 426/124 |
| 1,632,722 | 6/1927 | Woodall | 428/76 |
| 2,357,258 | 8/1944 | Harris | 99/172 |
| 2,413,129 | 12/1966 | Wilson | 99/193 |
| 2,524,162 | 10/1950 | Charannes et al. | 426/124 |
| 2,767,099 | 10/1956 | Sloan | 426/124 |
| 3,326,810 | 6/1967 | Dolan et al. | 428/76 |
| 3,409,444 | 11/1968 | Gentry et al. | 99/156 |
| 3,450,542 | 6/1979 | Badran | 99/154 |
| 3,559,562 | 2/1971 | Carlson et al. | 426/124 |
| 3,597,302 | 8/1971 | Geruid | 161/105 |
| 3,761,289 | 9/1973 | Wolf | 426/118 |
| 4,061,785 | 12/1977 | Nishino et al. | 426/124 |
| 4,079,152 | 3/1978 | Bedrosian et al. | 426/124 |
| 4,237,591 | 12/1980 | Ginocchio | 28/121 |
| 4,366,179 | 12/1982 | Nawata et al. | 426/419 |
| 4,383,376 | 5/1983 | Numamoto et al. | 428/474.7 |

FOREIGN PATENT DOCUMENTS 2467795  5/1981  France .

Primary Examiner—Bernard Lipman
Attorney, Agent, or Firm—Dowrey & Cross

[57] ABSTRACT

A cushioning pad which may advantageously be used in connection with the packaging and storage of fruits is described. Such pad contains a chemical composition for interacting with the atmosphere. The chemical composition may include chemicals such as calcium hydroxide for removing carbon dioxide and/or ethylene from the atmosphere to retard ripening and prevent damage to the fruit. The pad may also contain a hygroscopic chemical such as calcium chloride which causes certain kinds of cushioning materials to expand to better immobilize the fruit or other articles.

23 Claims, 4 Drawing Figures

ATMOSPHERE CONTROL CUSHIONING PAD

FIELD OF THE INVENTION

The present invention relates to a pad which is particularly suited for protecting and immobilizing produce and the like which includes a layer of cushioning material to which a chemical composition has been added.

BACKGROUND OF THE INVENTION

Many kinds of produce are fragile and are subject to damage in handling and shipping. In addition, produce has a limited lifetime during which it can be sold and used. In particular, fruits such as apples and pears are easily bruised and mature rapidly after they have been picked. The invention will, accordingly, be described herein with particular reference to fruits such as apples and pears although the invention is not limited to protection and preservation of fruit and may be used as well with respect to other produce and fragile articles.

Although some fruit is sold locally by the growers, the majority of fruit and other produce is shipped a substantial distance from the field to consumers. Two problems which arise as the result of the shipping and handling of pears and apples are bruising and overripening which may result in the food becoming unmarketable or marketable only at a lesser price. In addition, even though the fruit may arrive at a supermarket or other point of sale or use in good condition, the remaining saleable life of the fruit may be so short that it passes its prime level of ripeness before it can be sold.

One method of protecting apples and pears during shipment involves the use of formed cardboard trays which include recesses that conform generally to the fruit. A tray is placed in the bottom of a standard fruit carton and is loaded with a single layer of fruit. A cushioning pad is then placed on top of this layer to protect and immobilize the fruit. This cushioning pad may comprise a layer of fibrous cushioning material in a paper envelope. Successive layers of trays, fruit and pads are positioned atop the first layer until the box is full. Although this packaging method protects the fruit against bruising it does not slow the rate of maturation of the fruit.

Although it is desirable to have unprocessed fruit available during the entire year, the fruit season is fairly short, and apples and pears ripen and begin to spoil shortly after picking if they are maintained under ambient conditions. One method of extending the life of apples and pears has been the use of controlled atmosphere storage. Fruit in good condition is taken from the fields either in boxes as described above or in bins and is placed in a refrigerated storage chamber. The temperature of such storage chamber is gradually lowered to approximately 31°, the oxygen level is slowly reduced to between about 1 and 5% and the carbon dioxide level maintained below 1-2%. The fruit itself aids in achieving this low oxygen level since, even at reduced temperatures, it consumes oxygen and produces carbon dioxide and water vapor.

Apples and pears can be damaged by elevated levels of carbon dioxide. For example, pears may develop a pithy brown core which results from cellular damage if the levels of carbon dioxide rises excessively. Apples may also be damaged by excessive carbon dioxide, which damage is manifested as a browning of the skin. In addition, both fruits ripen more rapidly in the presence of elevated levels of carbon dioxide. As a result, after the fruit has been loaded into a controlled atmosphere chamber, a stack of bags of hydrated lime (calcium hydroxide) are frequently positioned in the chamber of aid in maintaining the carbon dioxide level at or below the desired percentage. During storage, however, the lime in the sacks may become glazed over as the outer layers are converted from calcium hydroxide to calcium bicarbonate. This greatly reduces the rate of uptake of carbon dioxide and thus reduces the effectiveness of this method of atmosphere control. In addition, the concentration of carbon dioxide within the bins and boxes may exceed that of the ambient atmosphere to which the sacks of lime are exposed due to poor circulation within such containers. Such storage is nevertheless reasonably effective in preserving the fruit for later use. It is thus not uncommon for apples to remain in controlled atmosphere storage for several months.

Notwithstanding the benefits of controlled atmosphere storage, the fruit continues to ripen rapidly between the time it is picked and the time at which controlled atmosphere storage conditions are actually achieved. Likewise, once the fruit is removed from controlled atmosphere storage the ripening process resumes. In fact, fruit that had been stored for extended periods under controlled atmosphere storage conditions will tend to reach its peak maturity very quickly after removal from storage. As a result, such storage, while permitting the availability of fruit year round, actually shortens the effective marketable life of the fruit during which it can be transported and stored at ambient temperatures.

SUMMARY OF THE INVENTION

As set forth above, excessive concentrations of carbon dioxide are deleterious to fruits such as apples and pears and increase the ripening rate thereof. It has been discovered that the storage life of produce such as apples and pears can be extended by controlling the concentration of carbon dioxide within the shipping boxes or bins. Another factor that effects the rate of maturation of fruit is the concentration of ethylene to which the fruit is exposed. During the process of maturing, the fruit also gives off increasing quantities of ethylene gas. Ethylene given off by one piece of fruit stimulates the ripening of all fruit exposed to it. Accordingly, the rate of maturation can also be slowed by removing ethylene from the containers in which the produce is stored as quickly as possible. In addition, the food or other object may be further protected by providing a cushioning pad which swells to further immobilize it. It has been found that these goals can all be accomplished by provision of a pad which includes a layer of cushioning material to which a chemical composition that interacts with the atmosphere has been added.

As set forth above, cushioning pads may include a layer of fibrous cushioning material such as macerated paper. The cushioning material may be effectively confined in an envelope, which may be of paper or other material which permits the pad to breathe. It has been found that the chemical composition may be added to the cushioning material either prior to forming it into a batt or by depositing it onto the batt before it is enclosed by the envelope. The edges of the covering material are then sealed around the batt to form the envelope and the batt is immobilized within this envelope. Testing has demonstrated that the uptake of carbon dioxide and water vapor by pads enclosed in conventional envelope forming paper is quite adequate to protect fruit such as apples and pears. If desired, however, the permeation of the envelope by carbon dioxide, ethylene or water vapor may be adjusted by using covering material of greater or lesser premeability or by alteration of the thickness of the mastic which confines the batt in the envelope.

One chemical which may be advantageously added to the cushioning material is calcium hydroxide also referred to as hydrated lime. Calcium hydroxide absorbs carbon dixoide by forming calcium bicarbonate. The disbursion of the hydrated lime or other such chemical throughout the envelope prevents the formation of a crust of inactive calcium bicarbonate which otherwise might block the rapid and complete removal of carbon dioxide from the interior of the box. In addition, it has been found that the spreading of calcium hydroxide across a larger area dramatically increases the rate of uptake of carbon dioxide, providing maximum protection to the produce. The inventor has discovered that such dispersion of the calcium hydroxide is achieved by mixing it with or spreading it on the layer of cushioning material used to form a cushioning pad.

Accelerated maturation of the fruit can also be prevented by elimination of ethylene gas from the ambient atmosphere. Potassium permanganate is one chemical which can be added to the layer of cushioning material to oxidize the ethylene gas. Preferably the potassium permanganate is used in conjunction with alumina, which acts as a carrier.

It has also been discovered that the fruit or other article can be further protected by addition of a hygroscopic chemical such as calcium chloride to the cushioning material. When calcium chloride is added to a cushioning material such as mascerated paper, it withdraws moisture from the atmosphere causing the material to swell. This swelling of the fibrous layer expends the pad and holds the fruit or other article more firmly in place to prevent mechanical damage. Other absorptive materials may also be added to the mascerated paper material.

DETAILED DESCRIPTION OF THE PREFERRED EMBODIMENTS

The cushioning pad of the present invention is especially useful in connection with the protecting of produce for storage or packing. Although many kinds of produce are fragile and subject to damage and deterioration during handling, storage and shipping, fruits such as apples and pears are easily bruised and mature rapidly after picking. The invention will, accordingly, be described herein with particular reference to fruits such as apples and pears without limitation of the invention thereto. As will be apparent to those skilled in the art, the pad of the present invention may be used as well with respect to other produce and fragile articles.

Figure 1:
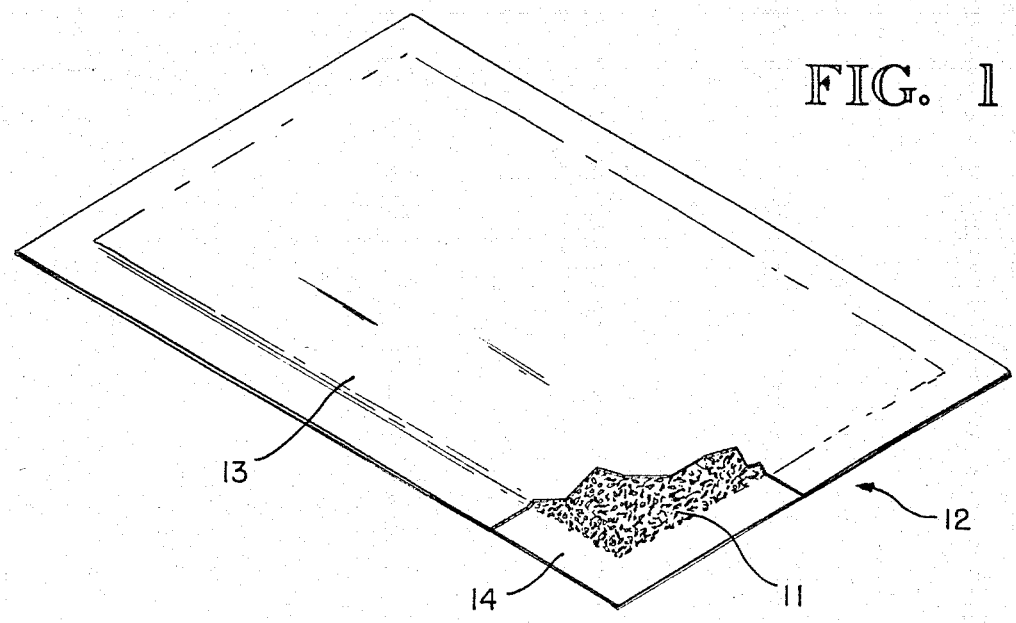
FIG. 1 is a perspective view of a cushioning pad according to the present invention with parts broken away.

As illustrated in FIG. 1, the pad of the present invention preferably comprises a layer of cushioning material 11 enclosed within an envelope 12. A chemical composition which interacts with the ambient atmosphere is added to the cushioning material as described below. Any of a variety of known cushioning materials which are compatible with the chemical composition may be used. Preferably, however, the layer of cushioning material is made of a fibrous material such as mascerated paper. The envelope 12 which contains the cushioning material is preferably formed of an upper sheet 13 and lower sheet 14. The layer of cushioning material 11 is immobilized within the envelope by glue applied to the interior surfaces of the envelope. The upper and lower sheets 13, 14 are of greater dimensions than the layer of cushioning material 11 and are sealed together by the glue along their edges.

Figure 2:
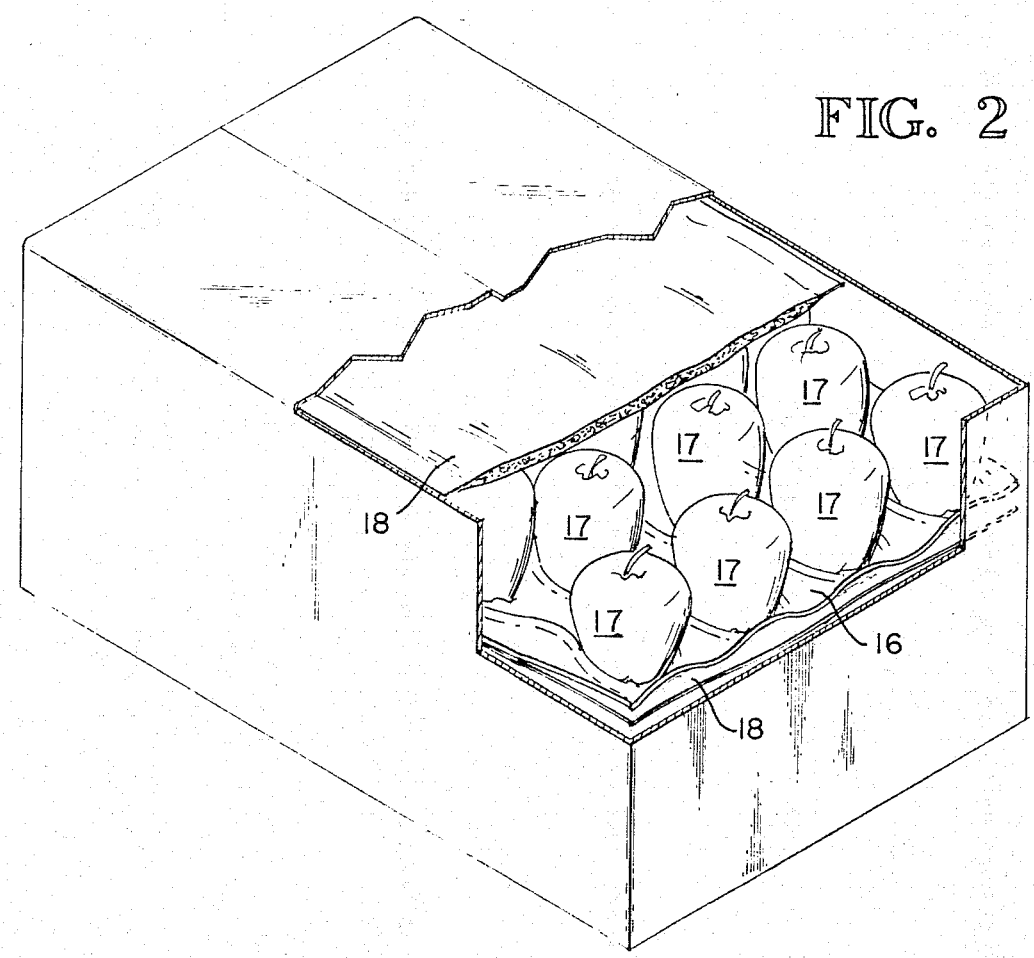
FIG. 2 is a perspective view of a loaded fruit shipping box with parts broken away to show the use of cushioning pads.

The pad of the present invention may be used in packaging fruit such as apples or pears in boxes. Such fruit is generally packaged in the industry by providing successive layers of fruit and packaging material in the box. As illustrated in FIG. 2, each layer consists of a molded tray 16 which is formed to include a plurality of recesses for receiving the fruit. After fruit 17 has been loaded onto this tray, a cushioning pad 18 is placed atop the fruit. Successive layers of trays 16, fruit 17 and pads 18 are placed in the box until it is full. One or more pads according to the present invention may be used depending on the results desired. For example, pads containing calcium chloride may be used atop each layer of fruit in the box in order to immobilize the fruit to prevent mechanical damage. In addition one or more of the pads may contain chemicals such as calcium hydroxide, potassium permanganate and alumina for withdrawing carbon dioxide and ethylene gas from the ambient atmosphere in the box.

Figure 3:
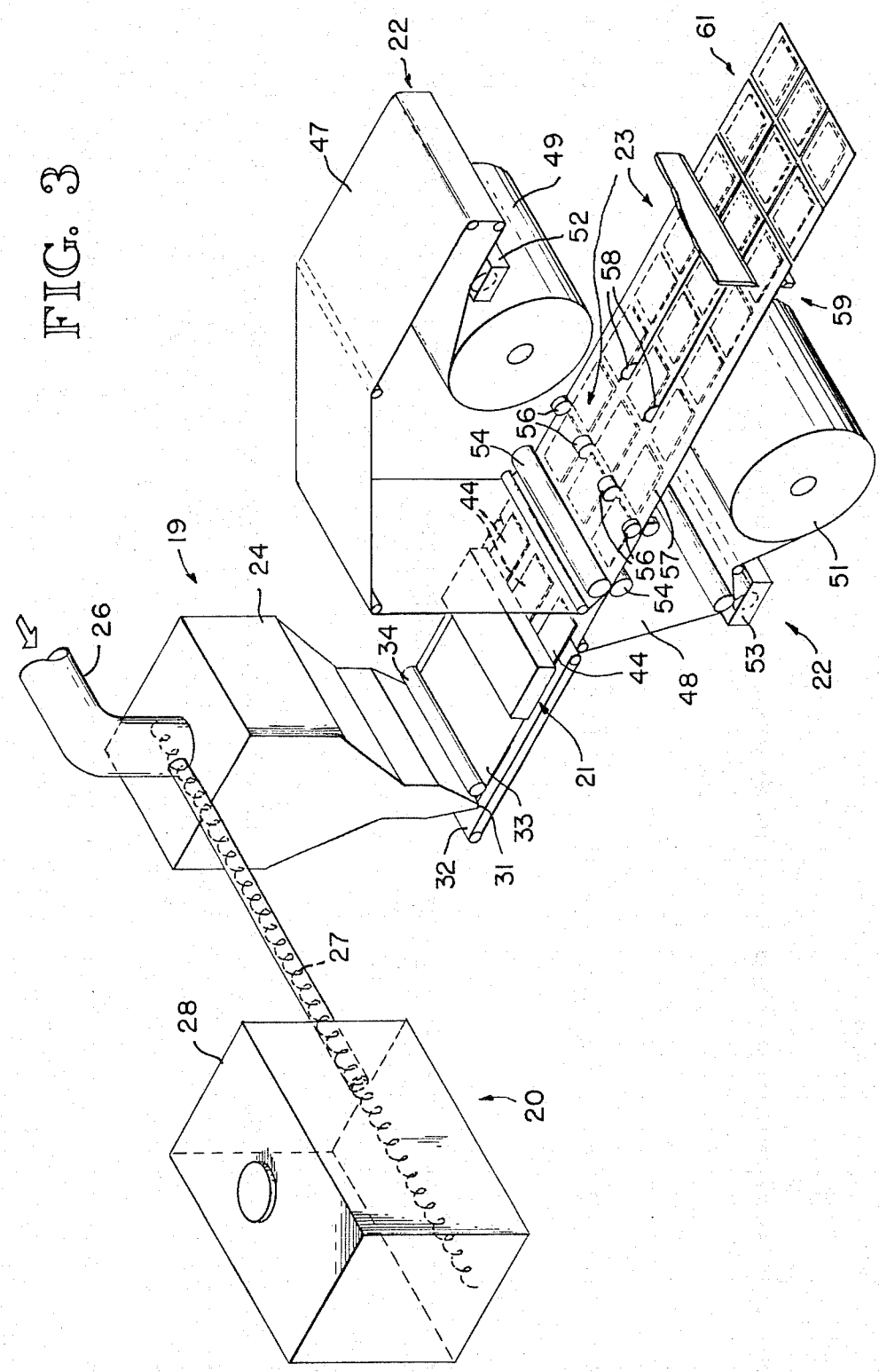
FIG. 3 is a perspective view of an apparatus for making cushioning pads.

As illustrated in FIG. 3, pads according to the present invention may be made by an apparatus comprising a mechanism for forming a continuous layer of cushioning material 19, a feed mechanism 20 for supplying the chemical composition for addition to the cushioning material, a mechanism 21 for dividing the continuous layer of cushioning material into a plurality of batts of desired dimension, a supply mechanism 22 for supplying the material to form envelopes for the batts, and a cutter and roller mechanism 23 for segmenting a continuous sheet of cushioning pads into discreet pads.

The mechanism 19 which forms the continuous sheet of cushioning material includes a hopper 24 which receives cushioning material. An auger feed mechanism 27 is used to supply the chemical composition from the chemical bin 28 to the hopper 24 for mixing with the cushioning material. The auger 27 is driven to supply chemicals to the bin only when cushioning material is being dispensed from the hopper 24 so that the concentration of the chemical constituent remains uniform in the pads produced. Mixing of the cushioning material and chemical constituent is accomplished within the hopper 24. The cushioning material is agitated in the hopper and this action aids in mixing the chemical composition with the cushioning material.

The bottom 31 of the hopper 24 is open and is positioned a short distance above a continuous belt 32. Material flows through this aperture when the belt 32 is moving and is compressed into a continuous batt 33 by a roller 34. The belt then conducts this continuous sheet 33 past the cutting mechanism 21 which segregates the cushioning material into discrete pads 44. Although any of a variety of prior art devices may be used to divide the continuous sheet 33 into discrete batts 44. In one mechanism which may be employed, the inlet of a blower may be disposed at one side of the conveyor 32 and a source of air under pressure may be disposed at the other side thereof to produce a localized transverse connection current of air which subdivides the sheet 34 into discrete batt portions 44.

It is not essential that the cutting mechanism 21 move as a unit with the conveyor 32 and sheet 33 in the course of removing the batt segment. Rather, the system may be operated intermittently as the conveyor 32 advances.

The discrete batts 44 are then fed off the belt 32 and between sheets of envelope material 47, 48 fed from continuous rolls 49, 51. A layer of adhesive is applied to each sheet 47, 48 along the facing surfaces between which the batts 44 are inserted. The two opposing sheets of paper pass between the press rollers 54 which press the sheets 47, 48 together to form a single sheet of padding material 57. Slitter and cutter mechanisms 58, 59 are provided to divide this sheet 57 into discreet pads 61.

In practice, the cushioning material is introduced into the hopper. A chemical composition is added to the cushioning material by means of an auger 27 which conveys it from a bin 28. The auger is actuated only when the conveyor 32 is running so that an excessive quantity of the chemical constituent is not added to the cushioning material 33 containing the chemical composition deposited on the conveyor 32 and is carried past the cutting mechanism 21 which divides it into discrete batts 44. These batts 44 are then fed off the conveyor 32 onto the lower sheet of envelope material 48. This sheet 48 is unwound from a supply roll 51 and passed over a glue applicator 53 prior to receiving the batt and is thus coated with glue. The upper sheet of envelope material 47 is then fed from the supply roll 49 and over the glue applicator 52 and is applied to the upper surface of the batts 44. The sheets 48, 49 are passed beneath rollers 54, 56 which seal them together about the periphery of the batts 44 into a continuous sheet 57 which is then divided into discrete pads 61 by the slitter and cutter mechanisms 58, 59.

Figure 4:
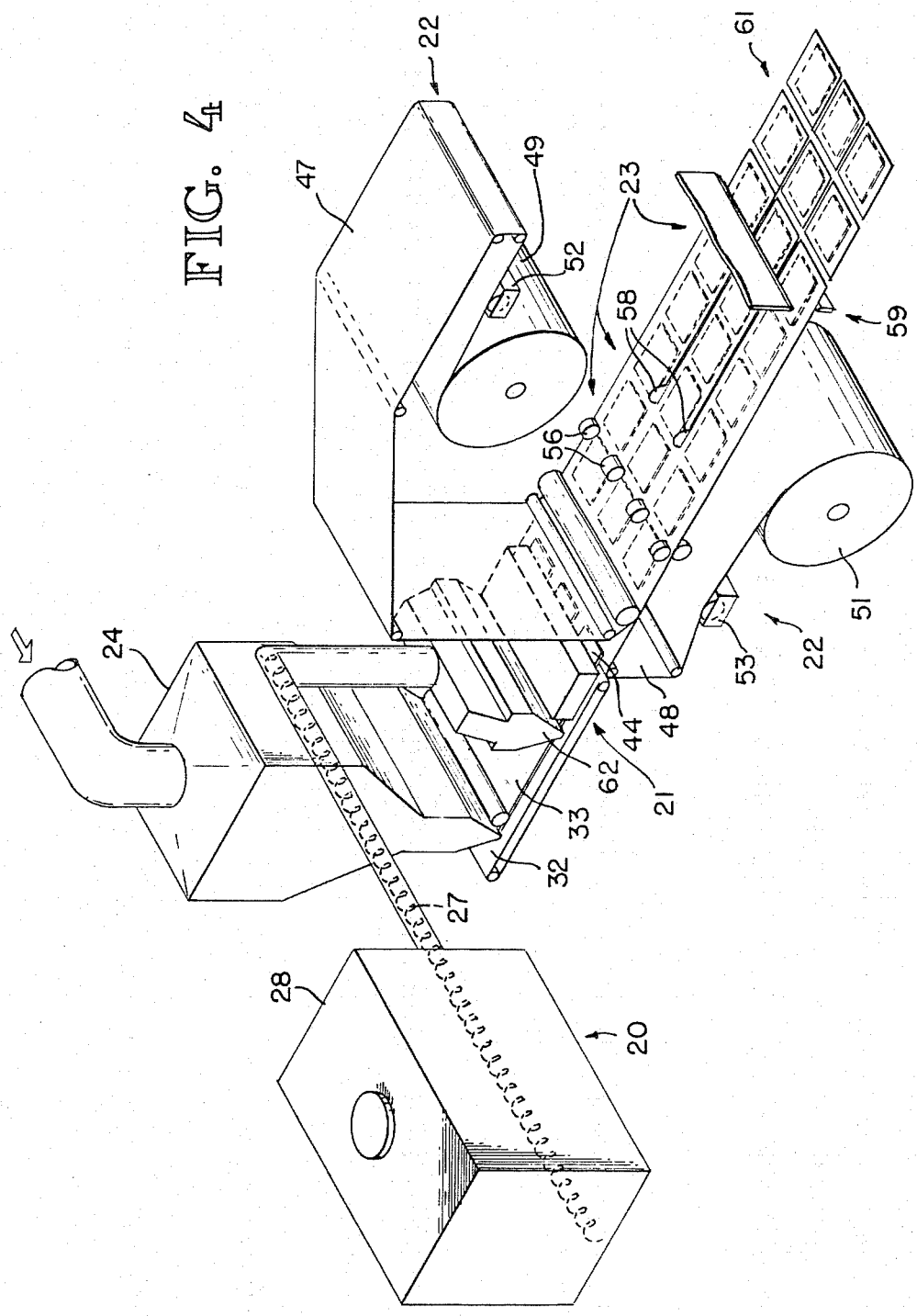
FIG. 4 is a perspective view of a second apparatus for making cushioning pads.

FIG. 4 illustrates a second embodiment of the invention. This embodiment is constructed and functions as described above with the exception that the chemical constituent is added to the cushioning material after it has been formed into a continuous sheet 33. This is accomplished by means of an applicator 62 which is positioned a short distance above the sheet 33. The auger 27 supplies the chemical constituent from the storage bin 28 to the applicator and, as with the apparatus of FIG. 3, operates to supply the chemical constituent only when the belt 32 is actuated to carry the sheet 33 past the applicator 62. This ensures that the chemical constituent is evenly distributed among the individual pads 61 formed by the apparatus.

The chemical composition may be added to the layer of cushioning material at either of two stages. One method of adding the chemical composition is to mix it with the cushioning material prior to forming of the material into a batt. The chemical composition may also be applied by depositing it onto the cushioning material before it is enclosed in the envelope 12. Either method results in the disbursing of the chemical composition in the layer of cushioning material 11, providing a greatly increased surface area of the chemical composition for withdrawing the gases from the ambient atmosphere.

The disbursion of the chemical composition in the pad is highly advantageous. The greatly expanded surface area of the chemical resulting from its disbursion within the pad provides rapid uptake of the targeted component of the atmosphere. For example, the inventor has determined that the rate at which carbon dioxide is withdrawn from the atmosphere by reaction with calcium hydroxide is greatly increased when the chemical is so disbursed. In testing, it was found that when calcium hydroxide was placed in a test chamber and confined to a $3'' \times 3''$ area, 150 minutes were required to withdraw all carbon dioxide from the chamber. When the area over which the calcium hydroxide was disbursed was increased to $9'' \times 9''$, however, a 10 fold decrease in the amount of time required to withdraw carbon dioxide from the chamber resulted. In the latter case, the more widely disbursed calcium hydroxide completed the task of carbon dioxide withdrawal in only 15 minutes. Rapid uptake of the carbon dioxide or other gas is further augmented by disbursion of the chemical in the cushioning material since this increases the surface area of the chemical available for reacting with this gas.

The disbursing of the chemical in the layer of cushioning material 11 also prevents waste of the chemical constituent by promoting complete use of the chemical constituent. For example, as set forth above, the chemical formed by reaction between carbon dioxide and calcium hydroxide can form a glazed layer which impedes uptake of carbon dioxide by the calcium hydroxide behind this glazed layer. By disbursing the chemical in the layer of cushioning material, however, the formation of such a barrier layer is greatly reduced or eliminated. Likewise, the reaction between bulk potassium permanganate and ethylene results in the formation of manganese dioxide which could slow the removal of ethylene gas.

A third advantage of the pad of the present invention is that the envelope prevents contact between the chemical constituent and the fruit or other article and permit multiple pads bearing the chemicals to be spaced throughout a shipping box, as illustrated in FIG. 2. In the case of a calcium hydroxide bearing pad, this ensures that all carbon dioxide is promptly and completely removed from all areas of the box.

Cushioning pads containing calcium chloride or other hygroscopic chemicals are also improved by dispersion of the chemicals throughout the cushioning layer 11. This promotes uniform expansion of the cushioning layer 11 and does not overwet the cushioning layer to the point where it becomes sodden.

Different kinds of chemical compositions may be used to make a pad according to the present invention. As set forth above, excessive carbon dioxide concentration can adversely affect produce such as apples and pears by damaging or causing discoloration of the fruit and by accelerating the ripening rate. Chemical compositions such as calcium hydroxide which absorb atmospheric carbon dioxide may advantageously be included as part or all of the chemical constituent of the pad. As set forth above, produce such as apples or pears generate carbon dioxide as they ripen. When such harvested produce is packaged or stored in boxes or bins, the level of carbon dioxide in such container may increase by as much as 1 or 2% per day. In fact, in a test performed using pears removed from controlled atmosphere storage, conventionally boxed pears generated sufficient carbon dioxide in 35 hours to raise the carbon dioxide level within the box to approximately 5½%. A similar box of pears, however, packed using 5 pads according to the present invention, each of which contained 2 ounces of calcium hydroxide, had an internal carbon dioxide concentration of less than 0.25% after 35 hours. The carbon dioxide concentration in the box, in fact, remained below 1% for in excess of 112 hours. At the end of 6 days the fruit packed with pads according to the present invention remained unripened even though such fruit normally would have ripened well within that time. Pads compounded to contain potassium permanganate should produce similar results.

Dispersion of the calcium chloride or other hygroscopic agent in the cushioning layer is also highly beneficial in ensuring protection of the fruit or other article. It has been found that approximately 2 ounces of calcium chloride absorbs sufficient moisture to cause the mascerated paper layer of a 12"×20" pad to swell to approximately 2½ to 3 times its original volume providing enhanced cushioning and immobilization of the fruit or other article. No moisture need be added to the pad to effect this expansion. The pad can therefor be used by packaging personnel without requiring any special training or additional labor. Such swelling of the pad results relatively rapidly once it is exposed to atmospheric humidity.

The pad of the present invention may be used in a variety of ways. Pads which contain a chemical constituent to retard ripening of produce may be used in the packaging of such produce into boxes for shipment to market from the field or after controlled atmosphere storage. In such case, the ripening of the fruit will be sufficiently delayed to provide additional shelf life or to increase additional storage time at the destination. In some instances, the retardant effect of the pad should be sufficient to permit non-refrigerated shipment of produce that would otherwise ripen excessively without refrigeration.

Such cushioning pad may also be used with a fruit destined for controlled atmosphere storage. Such produce may be shipped to the storage warehouse either in bins or in boxes. Since several days may be required to establish controlled atmosphere conditions in the storage room and since the produce may not arrive at the warehouse the same day it is harvested, the placing of the pads into the bins or boxes can aid in preserving the produce until controlled atmosphere conditions are actually established. The placing of the pad in proximity to the fruit in this manner also prevents excessive localized concentrations of carbon dioxide which may result from poor air circulation or pooling of the heavy carbon dioxide gas in the bottom of the bin or box. The level of carbon dioxide is thus maintained within acceptable limits at all times while controlled atmosphere conditions are being established. The amount of gas-withdrawing chemical added to each pad, and the number of pads used per box, of course, determine the amount of carbon dioxide or other gas which can be removed from the interior of the box by the pad. For general shipping and storage, however, approximately 1–3 ounces of calcium hydroxide may be added to the sized pad. Preferably, however, the chemical is spread throughout the pad such that its concentration does not exceed one gram per square inch. This provides rapid absorption of the carbon dioxide in the pad without impairing cushioning properties. The number of chemical-bearing pads used in each box may also be varied according to the protection desired.

The pads may also be used once fruit has arrived at the controlled atmosphere storage warehouse. In such instances, large pads contains 18–21 oz. or more of calcium hydroxide and sized according to the size of bins could be used to cover bins full of fruit. In addition, pads sized approximately 18"×40" may be used by sliding them into the stringers beneath bins which are provided to permit forklifts to pick up and move the bins. Such pads may contain 9 to 12 ounces or more of a material such as calcium hydroxide. Either type of pad may be used in conjunction with sacks of calcium hydroxide placed in the controlled atmosphere storage room. The greater surface area of the calcium hydroxide provided by these pads and the distribution throughout the room in close proximity to the fruit permitted by use of sack pads greatly aids in rapid achievement of controlled atmosphere conditions and prevention of excessive localized concentrations of carbon dioxide.

What is claimed is:

1. A cushioning pad for use in storage or packaging of produce comprising;
    a layer of cushioning material having voids throughout the body thereof;
    a gas permeable envelope containing said cushioning material; and
    a chemical composition dispersed in the voids in said cushioning material for interacting with the ambient atmosphere.

2. The cushioning pad of claim 1 wherein said chemical composition comprises a constituent for withdrawing carbon dioxide from the ambient atmosphere.

3. The cushioning pad of claim 2 wherein said constituent includes calcium hydroxide.

4. The cushioning pad of claim 1 wherein said chemical composition comprises a constituent for withdrawing ethylene from the ambient atmosphere.

5. The cushioning pad of claim 4 wherein said constituent includes potassium permanganate.

6. The cushioning pad of claim 5 wherein said constituent further includes an alumina carrier for the potassium permanganate.

7. The cushioning pad of claim 1 wherein said chemical composition includes a constituent for withdrawing water vapor from the ambient atmosphere and wherein said cushioning material includes a fibrous material which expands when exposed to water.

8. The cushioning pad of claim 7 wherein said constituent includes calcium chloride.

9. The cushioning pad of claim 1, 2, 3, or 4 wherein the layer of cushioning material includes a fibrous material.

10. The cushioning pad of claim 1, 2, 3, or 4 wherein the layer of cushioning material includes a nonfibrous material.

11. The cushioning pad of claim 1, 2, 3, or 4 wherein said cushioning material includes mascerated paper.

12. The cushioning pad of claim 3 wherein the calcium hydroxide is dispersed such that its maximum concentration in the pad is less than one gram per square inch.

13. An expanding pad for cushioning objects comprising:
    a layer of fibrous material which expands upon addition of moisture;
    a gas permeable envelope for containing said layer of fibrous material; and
    a hygroscopic chemical dispersed in said fibrous material constituent for withdrawing moisture from ambient atmosphere whereby the fibrous material is caused to expand.

14. The cushioning pad of claim 13 wherein said layer of fibrous material comprises a batt of mascerated paper.

15. The cushioning pad of claim 14 wherein said chemical composition comprises calcium chlorite.

16. A cushioning pad for protecting produce during storage or packaging comprising;
    a layer of cushioning material in batt form having voids throughout the body thereof;
    a gas permeable envelope surrounding said batt of cushioning material;
    a solid particulate chemical composition dispersed in said batt of cushioning material within the voids therein for interacting with the atmosphere about said pad, whereby the surface of adjacent produce is protected against mechanical impact and said dispersed particulate chemical interacts with the atmosphere surrounding the produce.

17. The cushioning pad of claim 16 wherein;
    said batt comprises a generally flat layer of loosely compressed fibrous material;
    said envelope includes top and bottom thin flexible envelope sheets of greater dimensions than said batt in contact with the top and bottom surfaces respectively thereof, and
    said top and bottom sheets being bonded to each other about the periphery of said batt and to the top and bottom surfaces respectively of said batt to immobilize the batt within the envelope.

18. The cushioning pad of claim 16 or 17 wherein said chemical composition comprises a constituent for withdrawing carbon dioxide from the ambient atmosphere.

19. The cushioning pad of claim 16 or 17 wherein said chemical composition includes calcium hydroxide.

20. The cushioning pad of claim 16 or 17 wherein said chemical composition comprises a constituent for withdrawing ethylene from the ambient atmosphere.

21. The cushioning pad of claim 16 or 17 wherein said chemical composition includes potassium permanganate and an alumina carrier therefor.

22. The cushioning pad of claim 16 or 17 wherein said chemical composition includes a constituent for withdrawing water vapor from the ambient atmosphere and wherein said cushioning material expands when exposed to water.

23. The cushioning pad of claim 16 or 17 wherein said chemical composition includes calcium chloride.

* * * * *

UNITED STATES PATENT AND TRADEMARK OFFICE
CERTIFICATE OF CORRECTION

PATENT NO. : 4,528,228
DATED : July 9, 1985
INVENTOR(S) : David M. Clevenger

It is certified that error appears in the above-identified patent and that said Letters Patent is hereby corrected as shown below:

Column 2, line 4, "of should read --to--.
Claim 15 at column 9, line 7, "chlorite" should read --chloride--.

Signed and Sealed this

Fifteenth Day of October 1985

[SEAL]

Attest:

DONALD J. QUIGG

Attesting Officer

Commissioner of Patents and
Trademarks—Designate